(12) United States Patent
Verma

(10) Patent No.: US 10,303,128 B2
(45) Date of Patent: May 28, 2019

(54) SYSTEM AND METHOD FOR CONTROL AND/OR ANALYTICS OF AN INDUSTRIAL PROCESS

(71) Applicant: SIEMENS AKTIENGESELLSCHAFT, München (DE)

(72) Inventor: Amit Verma, Berlin (DE)

(73) Assignee: Siemens Aktiengesellschaft, München (DE)

( * ) Notice: Subject to any disclaimer, the term of this patent is extended or adjusted under 35 U.S.C. 154(b) by 112 days.

(21) Appl. No.: 15/223,908

(22) Filed: Jul. 29, 2016

(65) Prior Publication Data

US 2017/0031327 A1 Feb. 2, 2017

(30) Foreign Application Priority Data

Jul. 30, 2015 (EP) .................................... 15179086

(51) Int. Cl.
*G05B 13/02* (2006.01)
*G05B 11/01* (2006.01)
*H04L 12/26* (2006.01)
*H04L 12/917* (2013.01)
*H04L 29/08* (2006.01)
(Continued)

(52) U.S. Cl.
CPC ............ *G05B 13/021* (2013.01); *G05B 11/01* (2013.01); *G05B 19/4185* (2013.01); *H04L 12/4015* (2013.01); *H04L 43/062* (2013.01); *H04L 47/6215* (2013.01); *H04L 47/76* (2013.01); *H04L 49/30* (2013.01); *H04L 67/125* (2013.01); *H04L 67/2842* (2013.01);
(Continued)

(58) Field of Classification Search
CPC .................................................... G05B 13/024
USPC ............................................................ 700/32
See application file for complete search history.

(56) References Cited

U.S. PATENT DOCUMENTS 6,058,461 A * 5/2000 Lewchuk ................ G06F 13/18
711/137
8,694,698 B2 * 4/2014 Mizuno .................. G06F 3/0611
710/33
(Continued)

FOREIGN PATENT DOCUMENTS

CN 102571556 A 7/2012
CN 102959912 A 3/2013
(Continued)

*Primary Examiner* — Suresh Suryawanshi
(74) *Attorney, Agent, or Firm* — Henry M. Feiereisen LLC

(57) ABSTRACT

In a system and a method for control and/or analytics of an industrial process and especially a system and a method for the prioritization of the data transmission of process data from plant-side automation and processing units to remote processing units external to the plant, the system has an the plant side at least one automation or processing unit, which carries out first process variable computations and acts on the process. On the side external to the plant, the system has a remote processing unit that carries out a number of second process variable computations and that receives local data from the at least one automation or processor unit via a data connection and at least one data collector unit. The data collector unit prioritizes the data transfer via the data connection between the at least one automation or processor unit and the processing unit external to the plant.

14 Claims, 2 Drawing Sheets

(51) Int. Cl.
  *G05B 19/418* (2006.01)
  *H04L 12/863* (2013.01)
  *H04L 12/935* (2013.01)
  *H04L 12/40* (2006.01)

(52) U.S. Cl.
  CPC .............. *G05B 2219/31241* (2013.01); *G05B 2219/31457* (2013.01); *Y02P 90/18* (2015.11)

(56) References Cited

U.S. PATENT DOCUMENTS

| | | | |
|---|---|---|---|
| 9,063,929 B2* | 6/2015 | Saeki | G06F 13/34 |
| 9,197,576 B2* | 11/2015 | Balasubramanian | H04L 12/4015 |
| 9,544,242 B2* | 1/2017 | Kraemer | H04L 47/6275 |
| 9,843,617 B2* | 12/2017 | Maturana | H04L 67/02 |
| 9,917,902 B2* | 3/2018 | Osei-Bonsu | H04L 67/125 |
| 2003/0200315 A1 | 10/2003 | Goldenberg et al. | |
| 2004/0156360 A1 | 8/2004 | Sexton et al. | |
| 2006/0171410 A1 | 8/2006 | Jung et al. | |
| 2013/0100805 A1 | 4/2013 | Heine et al. | |
| 2013/0211546 A1 | 8/2013 | Lawson et al. | |
| 2014/0129688 A1* | 5/2014 | Asenjo | H04L 43/04 709/221 |
| 2015/0134733 A1 | 5/2015 | Maturana et al. | |
| 2015/0281355 A1* | 10/2015 | Maturana | H04L 67/1097 709/202 |
| 2016/0112283 A1* | 4/2016 | Maturana | H04L 43/04 709/224 |
| 2016/0285954 A1* | 9/2016 | Werneke | H04L 67/06 |

FOREIGN PATENT DOCUMENTS

| | | |
|---|---|---|
| CN | 103685442 A | 3/2014 |
| CN | 103957228 A | 7/2014 |
| CN | 104636421 A | 5/2015 |
| CN | 105653591 A | 6/2016 |
| EP | 2924571 A2 | 9/2015 |

* cited by examiner

SYSTEM AND METHOD FOR CONTROL AND/OR ANALYTICS OF AN INDUSTRIAL PROCESS

CROSS-REFERENCES TO RELATED APPLICATIONS

This application claims the priority of European Patent Application, Serial No. 15179086.2, filed Jul. 30, 2015, pursuant to 35 U.S.C. 119(a)-(d), the disclosure of which is incorporated herein by reference in its entirety as if fully set forth herein.

BACKGROUND OF THE INVENTION

The present invention relates to a system and a method for control and/or analytics of an industrial process and more particularly to a system and a method for prioritization of transmission of process data from plant-side automation and/or processing units to processing units external to the plant.

The following discussion of related art is provided to assist the reader in understanding the advantages of the invention, and is not to be construed as an admission that this related art is prior art to this invention.

A plurality of plants that undertake process control generally fulfill simple automation and closed-loop control technology tasks. Commonly these tasks are carried out by automation units that are installed on site and thus in the vicinity of the process to be automated. Often such plants have a plurality of smaller automation units, oftentimes also spatially separated from one another, which then results in the individual process tasks also running in a distributed manner. Because of their restricted computing power, such smaller automation units tend not to be capable of mapping complex closed-loop control structures or closed-loop control and/or simulation strategies, as are possible in the higher classes of automation device. Such more complex closed-loop control strategies, which can require a significant computing capacity, can for example be so-called Model Predictive Controls (MPC), as are preferably employed in process engineering processes. Frequently the desire is also to set up complex closed-loop controls that are based on comprehensive historical data, and to use these for example in so-called Support Vector Machines (SVM), in order to be able to make optimizations to the process on this basis. Therefore such processing-intensive process engineering processes or data analysis models are frequently automated in the superordinate control and monitoring system of the plant.

We are currently experiencing a trend in the direction of central data analytics in external processing units (so-called cloud based analytics). With these external processing units cloud-based process controls for an industrial plant, the process data is collected from a plant in order to then provide it to an external processing unit for analysis. The analysis result is returned to the plant for improving the process control and process optimization. Because of its comprehensive analytics methods and the mostly self-learning techniques, cloud-based analytics allows a significant enhancement of the process controls. However the cloud-processing approaches are often not real-time-capable, because large amounts of data must be transferred from sensors or actuators of the industrial process or internally-formed data from the plant into the external processing unit, in order to analyze it there. Thereafter the analytics result is to be returned for further actions in order for it to become effective for the processes in the plant, which overall means unacceptable time delays. Closed-loop control circuits—especially when, because of the closed-loop control speed, comparatively fast sampling rates become necessary—are problematic with cloud-based methods on account of the uncertain but at least slightly deterministic communication delays. The major sources of such time delays lie a) in the data acquisition, the pre-processing and the compression, b) in the transmission of data into the cloud and c) in the analytics and result computation itself. To ameliorate the problem of latency times in cloud-based systems, attempts are being made to make data collection possible by suitable faster hardware. Furthermore it is proposed that the data undergoes processing in order for only a reduced amount of data then to be transmitted into the cloud-based system. A further point in the approach relates to the transmission of the data, in that attempts are being made to provide faster transmission channels with corresponding bandwidths. As part of the analytics itself the cloud-based systems are equipped with high-end computers running efficient algorithms.

It has been shown that high bandwidths and low wait times alone are often not sufficient. This is especially true when critical industrial processes and large amounts of data to be transmitted are involved.

It would therefore be desirable and advantageous to specify an alternate facility and an alternate method to obviate prior art shortcomings and to reduce latency times of support cloud-based process control and/or analytics deterministically in real time in the industrial environment and systematically.

SUMMARY OF THE INVENTION

According to one aspect of the present invention, a system for controlling an industrial process includes at least one automation or processing unit on the plant side. The industrial plant can be any plant with a production or fabrication process in the industrial environment. Plant-side means that the automation unit is a component of the local automation system and commonly is arranged close to the process. The automation unit carries out a number of first process variable computations. To this end the automation unit is linked into the process via sensors and actuators. Process input variables are the sensors and actuators, which, for the control of the process, are periodically inputted in and buffered by the input module of the automation unit and are thus available for further processing by the processors of the automation components. The actual processing within the automation unit is carried out in accordance with a process control algorithm. The output variables of this processing, i.e. the results of the process control algorithm of the plant-side automation unit generally become periodically effective for the process via an output module of the automation unit.

The plant-side processing unit can however also be an MES (Manufacturing Execution System) or ERP (Enterprise Resource Planning) system. Such MES or ERP systems possess a wide scope of functions, wherein their functions are based on the widest variety of process data and process variable computations. The intermediate data present in these systems that is to undergo further processing falls within the meaning of the term first process variable computations as used herein.

While the process variable computations of the automation units generally have a direct effect on the industrial process (for example by pre-specifying target values for a closed-loop controller) the process variable computations of MES or ERP systems tend to act indirectly on the industrial process, in that the MES is responsible for the scheduling of production processes, for example by determining the production plan by collection of orders or in that an MES carries out check and management of resources, in order to prepare for production or to carry out production ordering of the necessary material resources and/or informing another system about the progress of the production process. Or the process is acted on indirectly by the exchange of process data, status analysis of operational device situations, material usage information or historical or current process data.

The system also has at least one processing unit external to the plant, which carries out process variable computations and for this purpose receives local data from the plant-side automation or processing unit via a data link. The data link is realized via known communication mechanisms and standardized interfaces. The communication standards OPC (OPC DA, OPC UA) or TCP/IP (Profinet) belong to the communication mechanisms for example, which allow independent processing units to be interconnected into a distributed system. The standard interfaces include RPC, OLEDDB or SQL by way of example. A processing unit is to be seen as external to the plant if it is located spatially and/or functionally outside the local automation system. Such processing units external to the plant can be located at external service providers for example and are also referred to as cloud processing units.

The processing unit external to the plant carries out second process variable computations in parallel to or in addition to the computation of the first process variable computations of the plant-side automation or processing unit. In general these second process variable computations will be significantly more complex and require significantly greater computing power by comparison with the computing power within the local automation or processing unit. The more complex, second process variable computations in such cases will commonly be based on a larger volume of data. Where this data can be provided by the process itself (for example by additional and as yet unused sensors or actuators), said data is likewise read in and provided via the input element of the plant-side automation unit. Such data can however also include historical data or intermediate data, as is present for example within the plant-side automation or processing unit itself. The computations that are carried out in the processing unit external to the plant are far more complex and processor-intensive than those that can be carried out in the plant-side automation unit. Thus the external processing unit takes on expanded process engineering functions, as are known from MPC controls for example. Furthermore Condition Monitoring Systems, simulation systems or historical data based systems within this external processing unit can also carry out additional evaluations and for these purposes will also refer back to signals processed by the closed-loop controls. Because of the greater volume of data, especially historical data, the process control algorithms can for example also include so-called Support Vector Machine (SVM)-based Model Predictive Control (MPC) algorithms.

At least one data collector unit is disposed on the plant-side, wherein the data collector unit prioritizes the data transfer over the data link between the at least one automation or processing plant-side unit and the remote processing unit, external to the plant. The data collector unit is based on the underlying knowledge that, depending on the tasks of the remote processing unit, the local data does not have to be transmitted to the remote processing unit with equal priority. While different analytics or process management are addressed within the remote processing unit presents different demands in terms of data supply, the processes can be executed in parallel. On the other hand, certain tasks should be executed, especially deterministically repeatable, in real time while other tasks can be executed as subordinate task.

In an embodiment of the invention the data collector unit has a data buffer for buffering the local data. The data buffer stores all local data to be communicated to the remote processing unit and thus makes it available for prioritization.

As well as the data buffer, the data collector can also contain an element for pre-processing the local data. In this way for example a pre-compression of the data may be carried out.

According to a further aspect of the invention the data collector unit has a priority dispatcher and priority memories. The task of the priority dispatcher in these embodiments is to assign the local data to different priority memories, i.e. physically relocate local data into these priority memories. Alternatively, a prioritization within the data buffer is also possible by issuing of a priority flag for example. The local data is prioritized as a function of the requirements for its transmission time to the remote processing unit. The priority dispatcher has knowledge about which item of local data is relatively more important than another item of local data. The priority dispatcher obtains the information about this for example from the data record relating to the data item itself or via a categorization of data in respect of its use. For example for local data that is used for the comparatively fast closed-loop control algorithms, a higher-quality categorization can be stored than for data that is to be used for condition monitoring for example. In this way data is divided into different buffer areas and data with the highest priority level may be transmitted, as intended. Conversely the data with the lowest priority might not be transmitted at all, namely when the transmission becomes irrelevant as a result of the transmission of the higher-priority data. The priority memory with the highest priority is first transmitted to the remote processing unit, only when said data has been completely transmitted will the data of the priority memory with the next-lowest priority be transmitted etc. In the event of new data being loaded again from the data buffer into one or more higher-priority priority memories, the transmission of the data from the priority memory with lower priority is stopped and the data from the higher-priority memories will be transmitted, wherein transmission starts with the highest-priority memory content. Only after transmission of the higher priority memory content completes will the previously stopped transmission be started again. The priority memory can be realized in the form of a FIFO (first in first out) memory or in the form of a cyclic memory.

The priority memory can be dynamically configured by the priority dispatcher. i.e. the priority dispatcher can dynamically define the number of priority memories and can insure in this way that a sensible prioritization of the data transmission takes place. The priority dispatcher can allocate priority memory or release priority memory not needed.

In accordance with a further aspect of the invention the data collector unit has a monitoring module for the transmission speed of the communication connection to the remote processing unit, external to the plant. Advantageously it can be determined in this way whether the priority-controlled data transmission and the definition of the number of priority memories and the graduation of the different priority memories correlates with the volumes of data to be transmitted. For example a high transmission rate could reduce the number of priority memories and increase the jumps in priority between the different memories (graduation), while a lower transmission rate could increase the number and/or the granularity of priority memory graduation.

In one form of embodiment the monitoring module will update the priority dispatcher of the available transmission speed. In this way the latter can define the number and graduation of priority memories.

As an alternative or in addition the assignment of local data to the priority memories can also be undertaken on the basis of the available transmission speed. In this way for example data of an actually lower priority would be assigned to a priority memory of a higher order of priority when a comparatively higher transmission speed is available.

According to a further aspect the priority dispatcher is configurable such that it determines the transmission time requirement statically or dynamically. The transmission time requirement and subsequently the definition of the priority is determined from the significance of the local data to be transmitted. The priority of the data can depend on the application case of the analytics or of the process control. Thus for example data that contains the power consumption of a machine can be stored in a high-priority priority memory, while for example data about the vibration of the machine can be assigned in a memory of comparatively lower priority. Or it can be configured that process data of lower resolution and thus also lower data volume is stored in a high-priority memory, while process data with high resolution and thus also high data volume is stored in a memory with comparatively lower priority. In this way the system is advantageously capable of reacting to the data volume occurring?? and insuring that important data with low latency time requirement is processed in the remote processing unit and thus computation results from the processing unit external to the plant can promptly become effective for the process.

In an alternate form of embodiment the buffering of the data in the data buffer of the data collector unit can already be done by the priority dispatcher for example. Typically the collection of data in the data buffer is done on the basis of API (application programming interface) calls, which the actual data traffic then follows. These API calls can be made by the priority dispatcher. If data is classified as less relevant and thus of lower priority either dynamically during the runtime of the system or manually by an operator intervention, it can be insured that this data is not even buffered in the data buffer.

In an aspect of the invention there is provided a system for remotely controlling an industrial process in a plant, comprising at least one plant-side automation or processing unit disposed in the plant and acting on the industrial process, the plant side unit is capable of carrying out first process variable computations, and a remote processing unit, i.e. a processing unit disposed outside the plant, the remote unit capable of carrying out second process variable computations. The remote unit receives local data from the at least one plant-side unit via a data link. At least one data collector unit is disposed in the plant, the data collector unit prioritizes data transfer via the data link between the at least one plant-side unit and the remote unit.

The object is further achieved by a method for transmission of local data of an industrial process from at least one plant-side automation or processing unit disposed in the plant, to a remote processing unit, disposed externally to the plant by a plant-side data collector unit. The local data can be process data, historical data, intermediate data etc. A plant-side data collector unit is to be understood as a software-based data collector constructed from separate hardware or integrated as a software module into the at least one automation or processing unit. The data collector is linked for communication purposes to the at least one plant-side automation or processing unit. In a first step the method comprises collecting local data from the at least one plant-side automation or processing unit in a data buffer. In a subsequent step the locally buffered data is read out by a priority dispatcher and entered into priority memories of different orders of priority, wherein the entries are made as a function of the requirements for their transmission time to the remote processing unit. I.e. the priority dispatcher accepts the data from the data buffer and arranges it in one of the priority memories that have a different order of priority. A method step subsequent to this step sends the data stored in the priority memory of the first order of priority to the remote processing unit. The priority memory of the first order of priority in this case is the memory that contains the data of the highest priority. This guarantees that the high-priority industrial data is put into a high-priority buffer that is then transmitted with preference. The analytics element within the remote processing unit does not have to wait for the entire volume of data before it begins to analyze the data. Whenever results, even partial results, are available on the basis of the high-priority data, these are quickly sent back to the process, which leads to marked reduction of overall latency times in the system. The method is thus the basis for real time operations based on industrial data in cloud-based analytics applications.

In accordance with a further aspect of the invention, the data stored in the priority memory of order X where X is 2,3,4, . . . n is sent respectively after sending data stored in priority memories of smaller X, i.e. of higher priority. Stated differently after the data has been sent completely for the priority memory of order of priority 1 to the remote processing unit, the data of the priority memory of order 2 is sent and after all this data has been sent, the data of the priority memory of the order 3 and so forth.

The method can include the data from priority memories of a lower order not being sent, namely when it is recognized for example that not all local data may be transmitted to the remote processing unit within a defined time window. In this case the transmission of lower-priority data can be entirely dispensed with in favor of the higher-priority data and the corresponding memory can be cleared out.

According to an important aspect the sending of data from priority memories of the orders of priority X is stopped, where data has been entered in the interim into priority memories of orders of priority lower than X, i.e. having higher priority. In other words for example during the sending of data from the memory of the order 2 via the priority dispatcher, the priority memory of the order 1 is again being filled with one or more items of high-priority data, thus the sending of the data of the memory of order 2 is interrupted and the data of the memory of order 1 is sent.

In accordance with a further aspect the interruption of sending of data is ended, provided the data entered in the interim has been sent. i.e. after complete sending of data entered in the interim, the sending of the data of the memory of order of priority 2 is resumed. After this data has been sent, the data of the memory of order of priority 3 is sent and so forth. In this way it is insured that that the high-priority data is transmitted without delay or at least with little delay.

In an embodiment of the invention the priority memory is allocated dynamically by the priority dispatcher. The priority dispatcher is thus capable of defining the memory in accordance with the data volume and the distribution of the data in respect to its priority and thus the necessary transmission time.

When the data collector unit monitors the transmission speed of the data link to the remote processing unit and updates the priority dispatcher of the available transmission speed, then advantageously for example there can also be a dynamic allocation of the priority memory on the basis of the transmission speed. In this way the transmission behavior can be further optimized, while retaining the premise that the latency time is shortened.

As an alternative the priority dispatcher may undertake the entry of the buffered local data into the priority memories on the basis of the available transmission speed. I.e. with a higher transmission speed for example the number of higher-priority data that is assigned to the memory of the order of priority 1 can be higher, the decision criteria for a graduation of the priorities to be assigned could vary dynamically.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
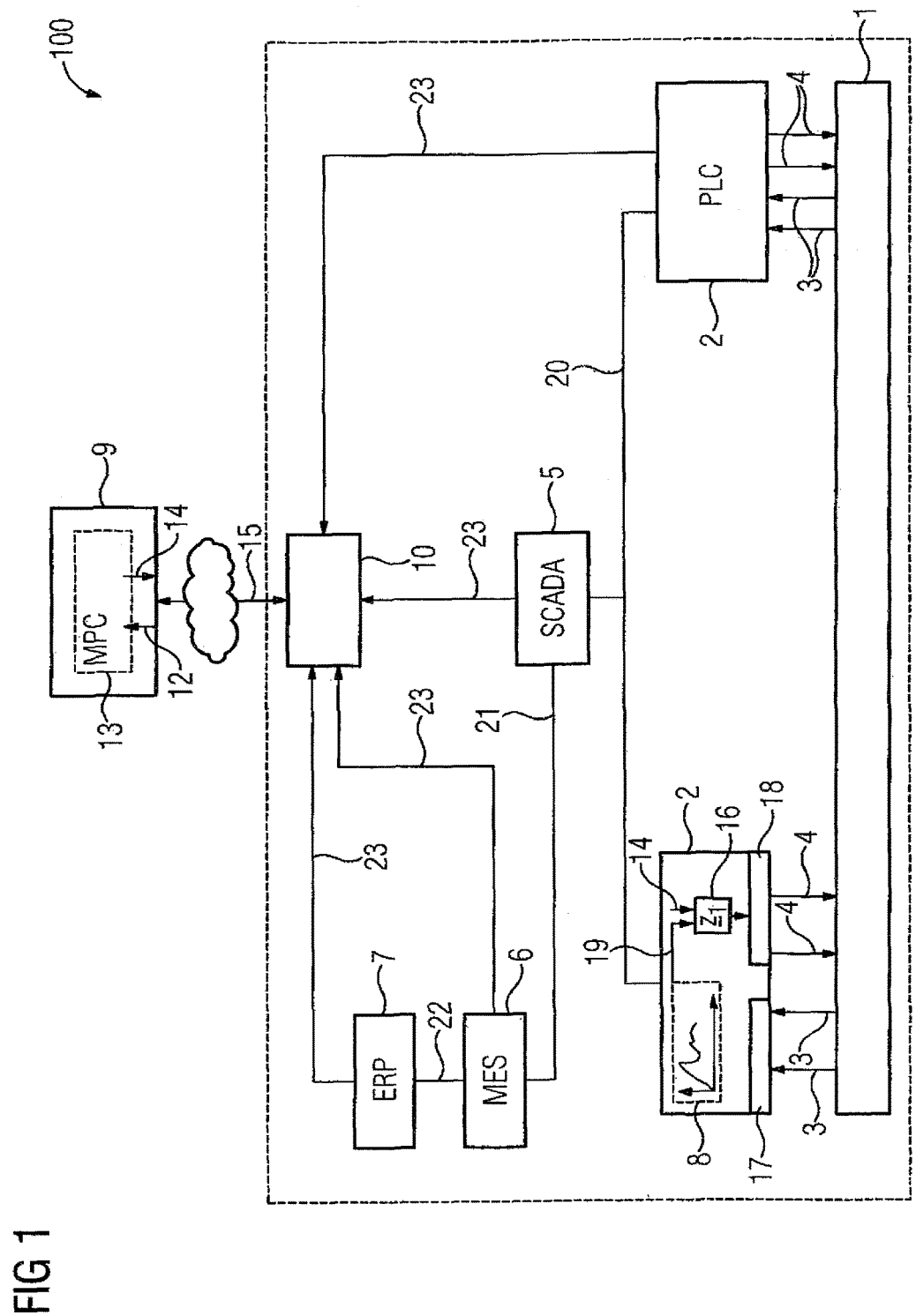
FIG. 1 shows a system for distributed process control of an industrial plant with central data collector unit.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a system, generally designated by reference numeral 100, for control of the industrial process 1, for example a process for water treatment in a water clarification plant or any given production process in the industry. The industrial process can be a process which runs within one location, but also across a number of sites. The process 1 is controlled and regulated via decentralized, plant-side automation units 2. These are equipped with one or more processors not shown here, which in collaboration with the necessary buffers, process the instructions stored in software code. The instructions may relate to all process control algorithms for open-loop control and closed-loop control of the process and also to data communication between the units. The automation units 2, for open-loop control and closed-loop control of the process, have a series of effective connections 3 to sensors or actuators not shown in FIG. 1. Via this connection the input element 17 reads in the data, which is then available in a memory area of the automation unit. Via the effective connections 4, control commands are realized from output element 18 to actuators of the process not shown in FIG. 1. Two automation units 2 are shown by way of example, however in practice any number of automation units will control, regulate and monitor the process. The automation units 2 are connected to the monitoring system 5, which takes over the control and monitoring of the process 1 via a data link 20. The monitoring system 5 maintains a data link 21 to the Manufacturing Execution System 6, which for its part maintains a data link 22 to an Enterprise Resource Planning System 7. On the basis of the local data generated via effective connection 3, the automation units 2 execute process control algorithms 8. These are monitoring analyses and closed-loop control functions effective for the process, which generally contain simpler and less complex analysis and closed-loop control tasks. The results of these process control algorithms are retained as process variable computation 19 in the automation unit 2 for further use and, where they are not needed, are overwritten in a subsequent cycle. The process variable computations 19 are however likewise influenced by computations within the superordinate systems 5, 6, 7. Thus for example planning specifications based on customer orders or supplies of materials from MES and ERP system can mean that specific manufacturing processes are to be executed more slowly, in a more energy-optimized manner or more quickly. The SCADA can for example, because of disruptions at another point in the production process (for example the packaging department) likewise influence the upstream production process (for example the filling).

In this configuration the system 100 is operational and can fulfill its control, regulation and monitoring tasks.

The system 100 is expanded by a remote processing unit external to the plant 9. This unit is equipped with one or more processors not shown here, which in collaboration with the necessary buffers, process instructions held in software code. The instructions relate to all process control algorithms for control, regulation and analytics of the process as well as to the data communication between the units. The processing unit 9 is connected via a data link 15 to a plant-side data collector unit 10. The data link 15 is preferably realized via the Internet as either a cabled connection or wirelessly. The data collector unit 10 receives from the automation and processing units 2, 5, 6, 7 via the data links 23 all local data that is necessary in the processing unit 9 for the aforesaid process control algorithms for control, regulation and analytics of the process 1. The data link 23 is to be understood in functional terms, physically this can be a separate network, or the data collector unit 10 is connected to an existing network within the system 100, for example 20, 21. The remote processing unit 9 executes process control algorithms 13 on the basis of input process variables 12 that are provided and prioritized by the data collector unit 10 and that are essentially based on the data generated via the effective connection 3 and outputs results 14 of these computations. The input process variables 12 can likewise be based on the historical data that is present in the automation unit 2. As an alternative or in addition the input process variables 12 can be based on historical data that is present in the processing unit 9 itself. For example FIG. 1 presents an MPC closed-loop control structure as a process control algorithm 13. More comprehensive data analytics can also be the subject matter of the aforesaid algorithm however. The results 14 of the process control algorithm 13 are transmitted to the automation and processing units 2, 5, 6, 7. The communication path via the data collector unit 10 can be used for this purpose or a separate communication path not shown here is used as an alternative. Within the automation unit 2 the checking module 16 can decide whether the results 14 have an impact on the process via the output element 18.

Figure 2:
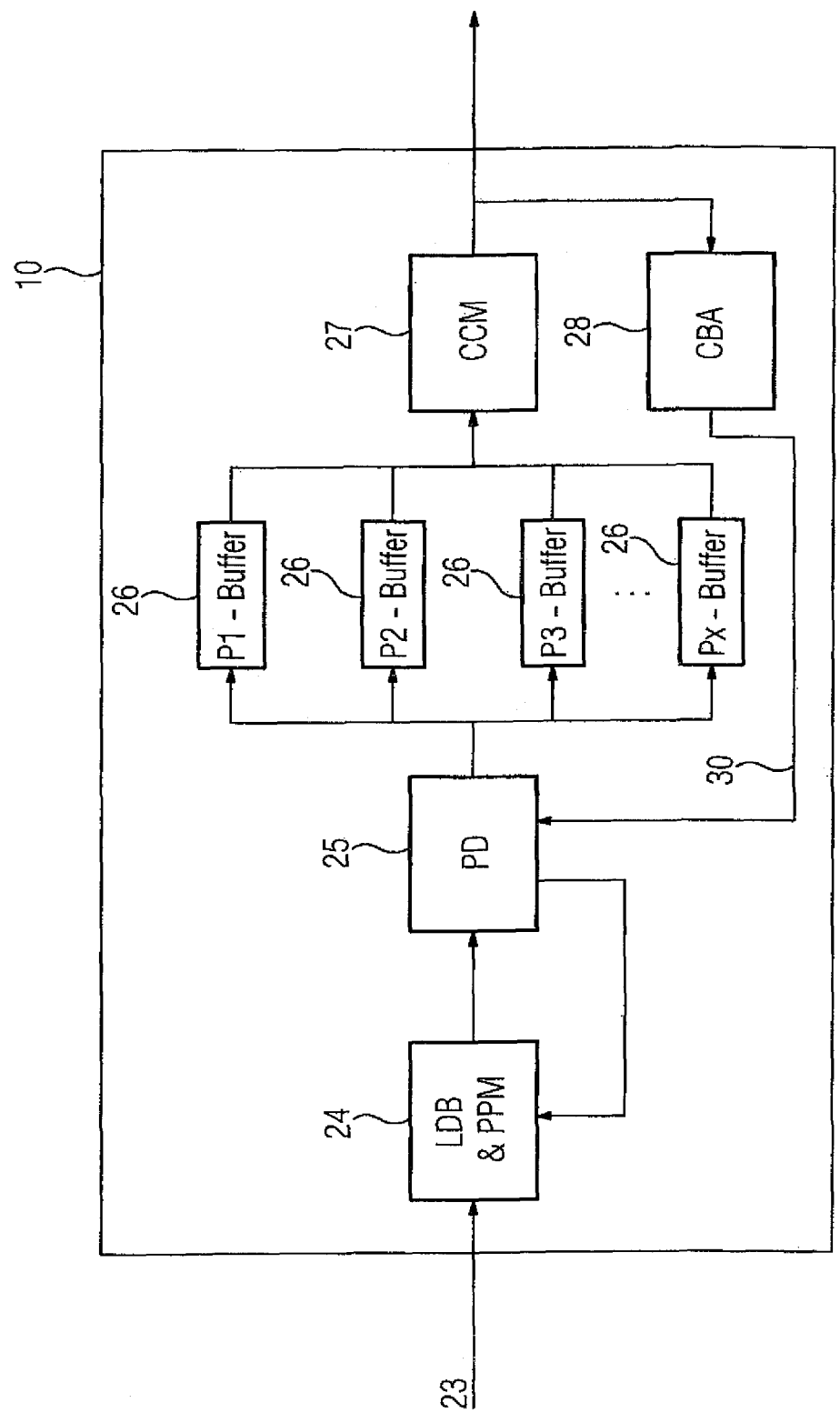
FIG. 2 shows the schematic diagram of the data collector unit.

FIG. 2 shows schematically the structure of the data collector unit 10. The data collector unit 10 involves separate computer hardware that is equipped with one or more processors not shown here and that, in collaboration with the necessary buffers, processes the instructions held in software code. As an alternative, the data collector unit 10 can also run as a software module on one of the plant-side processing units 5, 6, 7, preferably within the SCADA processing unit 5. Via the data link 23 the data collector unit 10 receives the local data, which is needed for the further analytics or process management tasks in the processing unit external to the plant 9. This data is stored within the data buffer (local data buffer) 24. The data buffer collects the data from different sources. In such cases it can follow static, i.e. previously defined rules, in asking which data is to be collected from which source. Here it uses standardized interfaces (e.g. RPC, OLEDB, OPC, SQL). By default all local data is stored there. A pre-processing module pre-processes the data if necessary. Such pre-processing could include the selection of data and thus a compression of data.

The priority dispatcher 25 reads the data from the data buffer 24 and transfers said data into one of the different priority memories 26 (P1-Px). The priority dispatcher 25 has knowledge about which data item is of greater significance relative to another data item for processing within the remote processing unit 9. More important data is given a higher priority and is thus transferred into a priority memory of a higher order of priority (e.g. P1). The priority dispatcher 25 can be configured as to whether the determination of the importance of an item of data and thus of its priority is to be done statically or dynamically. For example the priority can be determined in accordance with the actual case of process control, where e.g. data in conjunction with MCP closed-loop control structures is to be handled with higher priority. Or the priority is determined in accordance with the analytics case. Thus the priority dispatcher can be configured for example to evaluate current data of an electrical machine as higher-priority data and transfer it into the priority memory P1, while vibration data of the same electrical machine is transferred into the priority memory P2. However it can also be configured to transfer data with lower resolution (small data volume) into the memory P1, while data with high resolution (large data volume) is to be transferred into a memory of a lower order of priority.

The priority memories P1 to Px are implemented for example in the form of a FIFO (first in first out) buffer or in the form of a cyclic buffer.

As a result the priority memories P1 to Px contain the local data that is necessary for the processing unit 9, arranged in order of priority. The cloud communication module 27 sends the data to the remote processing unit 9, taking into consideration the assigned priority. The priority memory P1 is transferred first, then followed in sequence by the priority memories of the following orders. If for example the priority dispatcher 25 assigns an item of data to the memory P1, wherein the cloud communication module 27 is still transferring data out of the memory P3, this transmission is suspended in order to transfer the item of data out of P1.Once the transmission of this item of data is completed, the transmission of the data from the memory P3 is continued. The communication bandwidth analyzer 28 monitors the available bandwidth (data throughput) during the transmission to the processing unit external to the plant and makes this information available via the connection 30 to the priority dispatcher 25, which on the basis of this information for example adapts the prioritization and thus the assignment to the memories P1-Px, or which on the basis of this information dynamically creates or deletes priority memories. In addition the priority dispatcher can also notify the module 24 via the effective connection 31 and instruct it not to store selected data and sort said data out using its pre-processing.

The scheme described above will now be described in more concrete terms on the basis of the example given below. If a closed-loop control deviation from a target value over time for an industrial process is considered, then this target value deviation is the key parameter for the closed-loop control algorithm. The deviation is a function of the time and is read in from the process periodically via the effective connection 3 and thus with a certain resolution. The higher the resolution, the better the process variable computations can be done. For short response times however it is important for the process variable computations to take place within a defined short time (real time). The analytics modules that run in the remote processing unit external to the plant cannot therefore wait for the entire data record in full resolution in order to compute the process variables. In this case the priority dispatcher 25 will thus receive the local data from the data buffer 24 within a specific time in full resolution. The priority dispatcher 25 samples the serial data and for example assigns every 5 data item (data item N % 5) to priority memory 1, while each third intermediate data item (data item N % 5+3) is placed in priority memory 2. All further intermediate data (data items N % 5+1, N % 5+2, N % 5+4) are buffered in priority memory 3. Priority memory 1 is then transmitted to the remote processing unit 9. In this way the analytics module 13, for process variable computation 14 in the remote processing unit 9 initially receives the lowest-resolution data 12, but starts the computation 13 immediately. Provided the data can subsequently be transferred from the memories 2 and 3 without any great delay, this is taken into account in the computation 13. In the event of inability to transfer data within the required latency time, the computation 13 of the process variables is based exclusively on the lower-resolution data. In any event however it is insured that analytics results 14 are available for the process 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A system for remotely controlling and/or analyzing an industrial process in a plant, comprising;
   at least one plant-side automation or processing unit disposed in the plant and acting on the industrial process, the at least one plant-side automation or processing unit being capable of carrying out first process variable computations, the automation or processing unit controlling the industrial process by means of commands to actuators;

a remote processing unit disposed outside the plant the remote processing unit capable of carrying out second process variable computations, the remote processing unit receiving local data from the at least one plant-side automation or processing unit via a data link; and at least one data collector unit disposed in the plant, the data collector unit comprising a priority dispatcher, a priority memory, and a monitoring module, the data collector unit prioritizing data transfer via the data link between the at least one plant-side automation or processing unit and the remote processing unit, the priority dispatcher assigning the local data to different priority memories as a function of the requirement for their transmission time, and the monitoring module monitoring a transmission speed of a communication connection to the remote processing unit and updating the priority dispatcher of the available transmission speed.

2. The system of claim 1, wherein the data collector unit comprises a data buffer for buffering the local data.

3. The system of claim 1, wherein the data collector unit comprises an element for pre-processing the local data.

4. The system of claim 1, wherein data in content of priority memories of lower priority is not transmitted.

5. The system of claim 1, wherein the priority dispatcher dynamically allocates priority memories.

6. The system of claim 1, wherein the priority dispatcher assigns local data to the priority memories based on available transmission speed.

7. The system of claim 1, wherein the priority dispatcher is configurable to determine the requirements for the transmission time.

8. The system of claim 1, wherein the data collector unit comprises a data buffer for buffering the local data, and wherein the local data is buffered in the data buffer as a function of a command from the priority dispatcher.

9. A method for transmission of local data of an industrial process from at least one plant-side automation or processing unit disposed in a plant, to a remote processing unit external to the plant utilizing a plant-side data collector unit disposed in the plant, the data collector unit comprising a priority dispatcher, a priority memory, and a monitoring module, the method comprising the steps:

collecting the local data from the at least one plant-side unit and buffering the local data in a data buffer;

reading out of the locally buffered data by the priority dispatcher and entering of the buffered data into a plurality of priority memories having different orders of priority as a function of the requirements for their transmission time to the remote processing unit;

monitoring by the monitoring module a transmission speed of a communication connection to the remote processing unit and updating the priority dispatcher of the available transmission speed;

prioritizing by the data collector unit data transfer via the data link between the at least one plant-side or processing unit and the remote processing unit;

sending data stored in the priority memory of the first order of priority to the remote processing unit external to the plant; and controlling by the automation or processing unit the industrial process by means of commands to actuators.

10. The method of claim 9, wherein the data stored in the priority memories having order of priority x where x is any of 2, 3 to n is sent after completion of the sending of data stored in priority memories having order of priority smaller than x.

11. The method of claim 10, wherein content of priority memories having lower order of priority are not sent.

12. The method of claim 10, wherein sending of data from priority memories having order of priority x is interrupted when data is being entered into priority memories having order of priority smaller than x.

13. The method of claim 12, wherein the interrupted transmission of data of order of priority x is resumed subsequent to sending of data in priority memories having order of priority smaller than x.

14. The method of claim 9, wherein the priority dispatcher dynamically creates the priority memory.

* * * * *